June 1, 1954  J. J. GERRITSEN ET AL  2,679,856
PILOT OPERATED VALVE FOR CONTROLLING THE FLOW OF FLUIDS
Filed Jan. 29, 1951  3 Sheets-Sheet 1

Inventors:-
Jacobus J. Gerritsen,
and Richard C. Abel,
By: Smith, Michael & Gardiner,
Attorneys.

INVENTORS:
JACOBUS J. GERRITSEN
RICHARD C. ABEL.

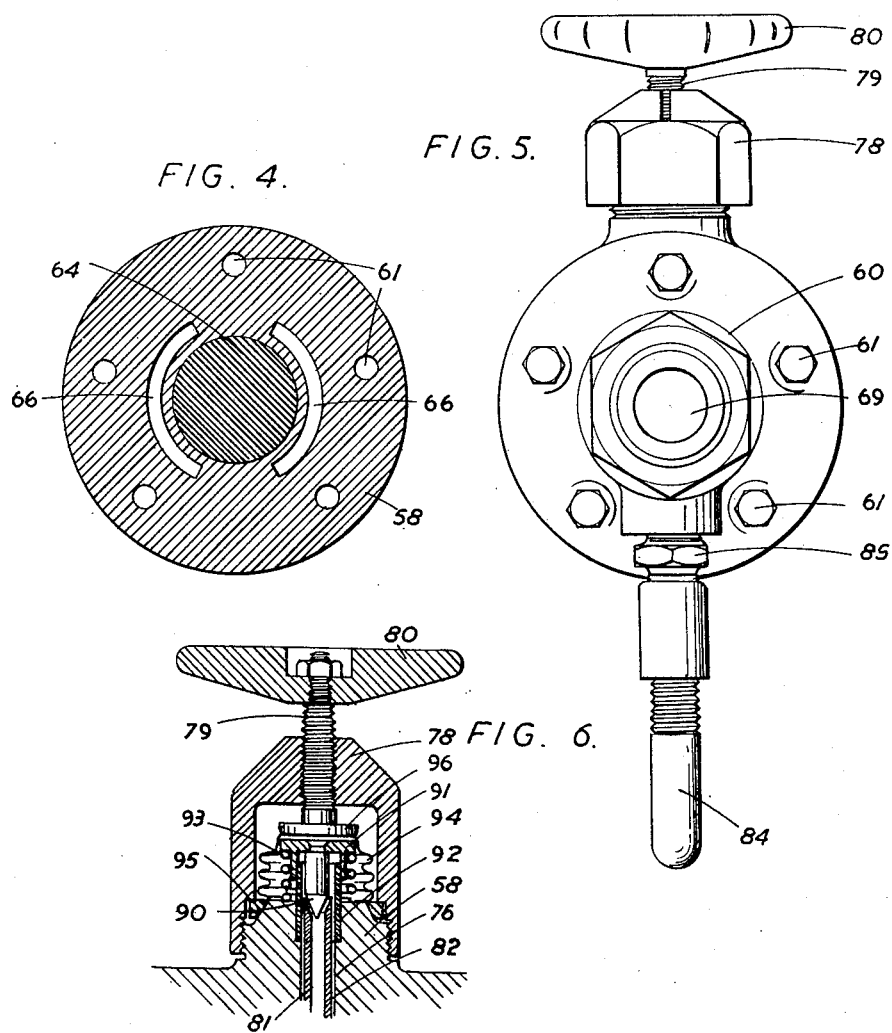

Patented June 1, 1954

2,679,856

UNITED STATES PATENT OFFICE 2,679,856

PILOT OPERATED VALVE FOR CONTROLLING THE FLOW OF FLUIDS

Jacobus Johannes Gerritsen, Redhill Aerodrome, Surrey, and Richard Cox Abel, Hove, Sussex, England Application January 29, 1951, Serial No. 208,279

5 Claims. (Cl. 137—221)

This invention relates to poppet-type valves for controlling the flow of fluids of the kind in which the pressures developed in the fluid itself are utilised to move or hold the poppet onto and away from its seating.

A known example of this general type of valve is the so-called "Johnson" valve in which the poppet is operated by a device which constitutes a double-acting hydraulic ram, the two chambers of which are selectably connectible the one to the interior of the valve-cavity, on the upstream side of the valve-seating, so as to be subjected to the pressure of the fluid whose flow is to be controlled, and the other to atmosphere, by means of a controllable selector valve. According to the position of the selector valve, the pressure of the fluid is applied to one or other of the ram chambers, the second chamber being in each case at atmospheric pressure, so as to cause the poppet to seat or unseat as required.

The main object of the present invention is to provide a valve of the so-called "Johnson" type which will meet the following requirements:

(1) In the open position it must offer no appreciable obstruction to the flow, i. e. the loss of head through the valve should be small;

(2) For many applications it should be unaffected by the attitude of the valve in space and by accelerations, in any direction and of any magnitude, of the body in which the valve is mounted;

(3) It must be capable of handling corrosive, inflammable, poisonous, and otherwise dangerous or destructive fluids;

(4) It must be immune from leakage or discharge to atmosphere of the fluid handled;

(5) It must be capable of satisfactory operation over a wide range of temperatures and pressures, including very high-pressures, and under conditions of high flow-rate;

(6) It must be controllable by external means exerting controlling forces which are small relatively to the valve-opening and -closing forces;

A further object of the present invention is to regulate the extent to which the poppet leaves its seating and hence to regulate the rate of flow through the (main) valve by adjusting the orifice of the pilot valve, which furnishes in effect an adjustable constriction in the by-pass, whereby the distribution of the pressure drop from the upstream opening of the passage leading to the ram-chamber to the downstream opening of the by-pass can be regulated.

A further object of the present invention is to provide a valve of the so-called "Johnson" type in which the rate of flow through the valve is sensitive to variation of throttling of the by-pass and can be closely controlled from zero to the maximum capacity of the valve by adjustment of the pilot valve.

A still further object of the present invention is to provide means to ensure that the operation of the valve shall be unaffected by its attitude relative to the earth's gravitational field or by accelerations, and to accomplish this, the movable member of the cylindrical assembly constituted by the poppet and the movable member of the ram unitary therewith is preferably of the same mass as the volume of fluid it displaces, so that when immersed in such fluid said movable member of the cylindrical assembly is in hydrostatic equilibrium.

The manner and means by which the foregoing objects, and such other objects as may hereinafter appear, may be achieved will appear from the following description having reference to the accompanying drawings illustrating two specific embodiments of the invention and a modification of one of them by way of example only and without limitation of the scope of the invention as defined in the appended claims. In the drawings, Figure 1 is an axial section of an electrically controlled valve;

Figure 4 is a section on the line 4—4 of Figure 3;

Figure 5 is an end elevation of the valve shown in Figures 3 and 4; and

Figure 6 is a view corresponding to a part of Figure 3 and illustrating a modification.

Figure 1:
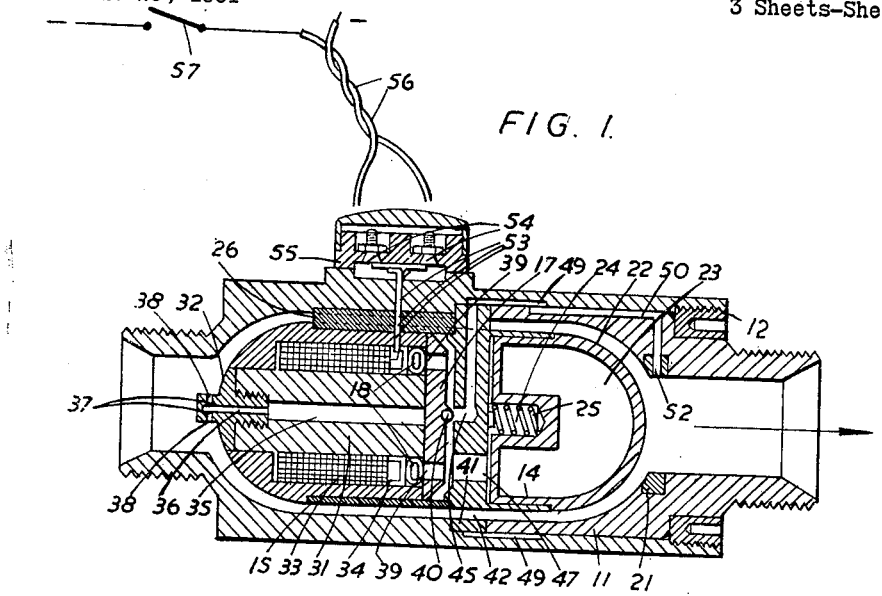
Figure 2:
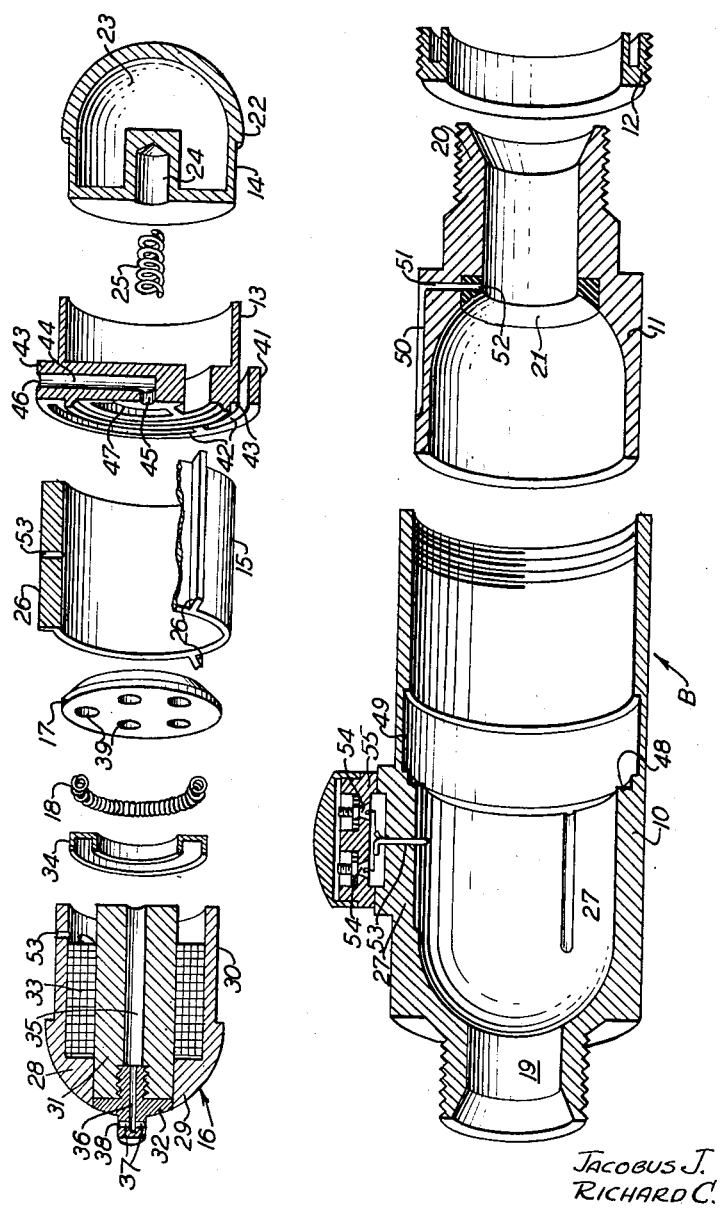
Figure 2 is an exploded view of the same valve.

The valve illustrated in Figures 1 and 2 comprises a valve body composed of two members 10 and 11, said members enclosing a cylindrical cavity having hemispherical ends. Member 11 fits into member 10 and is secured in place by an externally threaded collar 12 engaging an internal thread in the open end of member 10.

Within the cavity of the body formed by members 10 and 11, is coaxially located a cylindrical assembly with hemispherical ends comprising a ram-cylinder 13, a ram piston 14, a non-magnetic supporting sleeve 15 and a magnet core member 16. A disc armature 17 and an annular compression spring 18 are housed in this assembly.

Axial inlet and outlet tubes 19 and 20 formed, respectively, in the members 10 and 11, communicate with either end of the valve-cavity whose otherwise hemispherical ends are made slightly ogival by fairing the margins of the openings of tubes 19 and 20 into the valve-cavity. The margin of the outlet opening forms a seating 21 for the hemispherical end 22 of piston 14 constituting the valve poppet; and this margin may be provided with a seating ring fixedly secured within a groove formed in member 11. The direction of fluid flow is indicated by an arrow in Figure 1.

The piston 14 is hollow, its cavity 23 constituting an enclosed buoyancy chamber, the relation between the volume of this buoyancy chamber and the total volume of piston 14 being dependent upon the densities of the material of which piston 14 is made and of the fluid which the valve is controlling, and usually being predetermined to suit the particular fluid which the valve is intended to control. In the base of piston 14 is a boss in which is formed a recess 24 housing a light spring 25, which spring abuts on the head of the ram-cylinder 13.

The sleeve 15 has three external radial ribs 26, which fit into longitudinal keyways 27 in the wall of the cylindrical part of the cavity of member 10, and thereby support and locate the cylindrical assembly 13—16.

The magnet core member is composed of three parts, an outer part 28, an inner part 31 and an end plug 32. The part 28 has a cylindrical portion 30, which fits in sleeve 15, and a hemispherical end 29, whose shape is completed by plug 32. Parts 28 and 31 are of soft iron and fit together to enclose a blind annular space, in which is disposed a solenoid type winding 33, a spacer ring 34 and the spring 18. Ring 34 is of non-magnetic material and hermetically encloses the winding 33. Ring 34 also constitutes an abutment for spring 18, which spring bears on the disc armature 17 and, when unstrained, projects from the pole faces of the core parts 28, 31. The armature 17 is of soft iron and fits slidingly in sleeve 15. It is pierced by a number of holes 39 allowing the fluid to pass through it, and carries a central ball or needle 40 constituting the movable member of the pilot valve.

The inner part 31 is centrally bored to provide an axial passage 35 continued by, and communicating with, a constricted axial passage 36 and radial passages 37 in the end plug 32 terminating in openings 38 situated centrally of the upstream-facing hemispherical end of the cylindrical assembly 13—16.

Integrally formed with the ram cylinder 13, with which it is connected by integral webs 43 is a ring 41 between which and the cylinder 13 is an interrupted annular space 42 connecting the interrupted annular passage between the member 10 and the sleeve 15 with its continuation between member 11 and cylinder 13. The ring 41 is clamped between the inner end of member 11 and a shoulder 48 in member 10 thus locating the cylinder 13. When the parts are assembled, the webs 43 are aligned with the ribs 26 so as to offer the minimum obstruction to the flow of the fluid through the annular passage between the cylindrical assembly 13—16 and the walls of the valve-cavity.

A radial passage 44 drilled through the ring 41, one of webs 43 and the head of cylinder 13 connects a central opening 45 in the cylinder head forming the seating for ball or needle 40 with an opening 46 in the rim of ring 41, which opening 46 communicates with an annular recess 49 formed in member 10. Openings 47 in the head of cylinder 13 allow the fluid to enter the cylinder freely from the space between the cylinder head and the disc armature 17.

The annular recess 49 communicates with a longitudinal groove 50 in the cylindrical outer surface of member 11. Groove 50 communicates by means of a radial passage 51 with an opening 52 in the wall of the outlet tube 20 immediately downstream of the poppet seating 21.

The ends of the winding 33 are brought out to the exterior of the valve body through a radial conduit 53 drilled through the body-member 10, one of the ribs 26 and the magnet-core part 28 and are thus completely encased and protected from contact with the fluid in the valve cavity. They are attached to terminals 54 mounted in a terminal block 55 of insulating material. Leads 56 are attached to the terminals and one of the leads is connected to a control switch diagrammatically indicated at 57 in Figure 1.

When the circuit controlled by switch 57 is open, the armature 17 is moved by spring 18 away from the magnet pole faces and the ball or needle 40 seats in the opening 45 and closes the by-pass passage 44, 46, 49, 50, 51, 52. Fluid can enter the ram-cylinder 13 through openings 38, passage 37, 36, 35, holes 39 and openings 47, and so establish in the ram-cylinder a pressure equal to that at the inlet of the valve chamber, and, as long as the fluid is in motion, greater than that acting on the poppet 22 of piston 14 tending to hold it off its seating. The piston 14 is therefore moved towards the outlet until its poppet 22 seats on the seating 21 at the margin of the outlet. When the poppet 22 seats and flow stops, the pressure in the ram-cylinder and the pressure acting on the poppet 22 upstream of the seating 21 are equalised but the projected area of the poppet perpendicular to the axis on which it acts is less than that of piston 14 in the ram-cylinder, so that the unseating effort is less than the opposed effort of the ram. The poppet therefore remains seated.

When the circuit controlled by switch 57 is closed to energise the magnet 16, the armature 17 is attracted to the pole faces and withdraws the ball or needle 40 from the opening 45, thus opening the by-pass 44, 46, 49, 50, 51, 52. The pressure at opening 52 being less than at the openings 38, flow takes place through the by-pass, and the constriction of passage 36 ensures that the drop of pressure between openings 38 and opening 52 is concentrated in passage 36, thus reducing the pressure at the openings 47 and hence in the ram-cylinder 13, thus reducing the effort of the ram on the piston 14 sufficiently for the opposed effort of the external pressures on the poppet 22 to overcome it and unseat the poppet. When flow through the valve cavity takes place, the pressures acting on the poppet 22 are reduced relatively to that at openings 38, but now act on the whole area of the poppet, and, as long as the by-pass is open, the pressure in the ram cylinder is insufficient to return the poppet to its seating against the pressures acting on its outer surface tending to unseat it.

Figure 3:
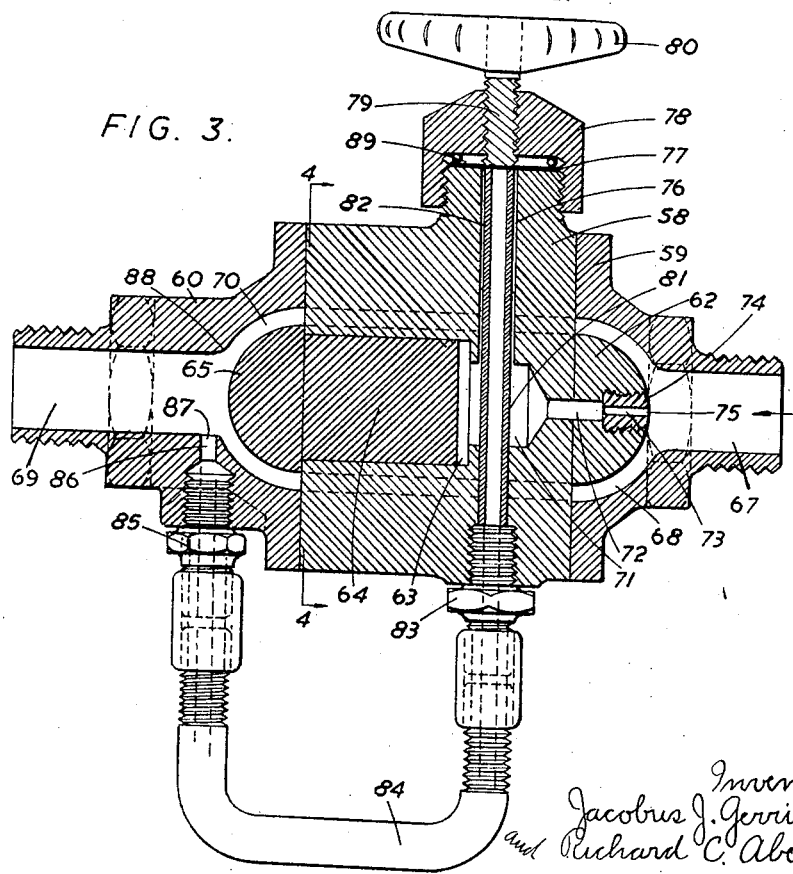
Figure 3 is an axial section of a manually controlled valve.

The manually operated valve illustrated in Figures 3, 4, and 5 is of very simple construction enabling it to be made cheaply. The body comprises three parts, a central part 58 and two end parts 59, 60, held together by through-bolts 61. The centre part 58 is bored endwise to furnish a ram-cylinder 63 in which slides a ram-piston 64 with a hemispherical end 65 constituting the poppet. The centre part 58 is also pierced longitudinally by two slots 66 of arcuate cross-section, together constituting an interrupted annular passage, and has a hemispherical boss 62 coaxial with and of the same diameter as the poppet 65 and as the inner wall of the annular passage 66. The inner portion of the part 58 bounded by the annular passage 66, the boss 62 and the poppet 65 together constitute a cylindrical assembly with hemispherical ends located coaxially in the cylindrical valve-cavity.

The end parts 59, 60 of the body have coaxial inlet and outlet passages 67 and 69, respectively, terminating in hemispherical recesses 68 and 70 of the same maximum diameter as the outer wall of the annular passage 66 of the central part 58. The valve-cavity is therefore cylindrical with hemispherical ends.

The direction of flow is indicated by an arrow in Figure 3.

The inner rim 88 of the hemispherical recess 70 of the part 60 surrounding the opening of the outlet passage 69 constitutes the seating for the poppet 65.

The ram-cylinder 63 communicates with a chamber 71, from which extends a central, axial passage 72, continued by and communicating with a constricted passage 73 through a restrictor 74 in the centre of the upstream-facing hemispherical boss 62 and terminating in an opening 75.

From the chamber 71 extends a passage 76, the outer end of which is closed by a flexible diaphragm 77 whose edge is clamped to the body port 58 by a sealing spacer ring 89 secured by a collar 78 internally threaded to screw onto an external thread on the part 58 and having a central internally threaded hole receiving an externally threaded stem 79 which can be screwed down onto the diaphragm 77 by means of a hand wheel 80.

Coaxially arranged within the passage 76 with a surrounding clearance 82, is a tube 81 on whose open end the diaphragm 77 seats when pressed down by the stem 79. The tube 81 crosses the chamber 71 and its other end is sealed into the body part 58 and extends to the outer face of the body where it communicates through a union 83 with an external U-tube 84, whose other end communicates through a union 85 and a passage 86 in the end part 60 of the body with an opening 87 just downstream of the poppet seating 88.

The passage 76, tube 81, U-tube 84 and passage 86 constitute the by-pass, and the diaphragm 77 is the movable member of the pilot valve, whose orifice, furnished by the leakage path between the mouth of tube 81 and the diaphragm 77, can be varied by adjusting the stem 79 by means of the hand-wheel 80, enabling the flow through the main valve to be regulated.

In the modification illustrated in Figure 6, the upper open end of tube 81 is counter-bored to provide the conical seating on which a needle 90 is seatable. Needle 90 is riveted to a flanged thimble 91, between the flange of which and the top of the threaded portion of the body part 58 is trapped a compression spring 93, and whose skirt is guided on a guide tube 92 lodged in a counter-bored recess in the top of the passage 76 in the body part 58. The needle 90, member 91 and spring 93 are enclosed in a seamless flexible bellows 94 whose closed end rests on the head of member 91 and whose skirt is clamped between a taper on the body part 58 and an internally tapered clamping ring 95 retained by an internal shoulder of the threaded cap 78. Between the end of the threaded stem 79 of the hand-wheel 80 and the closed end of the bellows 94 overlying the head of member 91 is inserted a mushroom-shaped pad 96.

It will readily be seen that adjustment of needle valve 90 with respect to the open upper end of tube 81 is effected by manipulating the hand-wheel 80, while the bellows 94 furnishes a fluid-tight seal completely enclosing the needle valve and its associated seating.

We claim:

1. A fluid-flow controlling valve comprising a valve body having a generally cylindrical cavity with substantially hemispherical ends, an inlet centrally situated in one such end and an outlet centrally situated in the other such end, the margin of the outlet constituting a valve seating, a generally cylindrical core of greater diameter than the outlet, located coaxially in said cavity with surrounding clearance and comprising a stationary member having a substantially hemispherical end portion directed toward said inlet and an axially movable member having a substantially hemispherical end portion directed toward and adapted to seat on said valve seating, the stationary member including radial core-supporting and -locating webs and inner and outer coaxial magnetic elements defining a blind annular recess, a solenoid winding in said recess, a non-magnetic member sealing the open end of said recess and enclosing the winding, a terminal block on the outside of the body, electrical connections from said winding to said terminal block, said connections being enclosed in a radial passage penetrating the outer magnetic element, a radial web and the body, said stationary member further including a fixed apertured diaphragm separating a space adjacent the movable member and constituting a ram-chamber from a space between the diaphragm and the magnetic elements, an apertured disc-armature axially movable in said last-named space, spring loading means tending to move the armature away from the magnetic elements, a central passage in the inner magnetic element extending from a central opening in hemispherical end portion of the stationary member to said last-named space, a by-pass passage extending from said last-named space through the diaphragm and body to an opening in the outlet downstream of and contiguous with the valve seating, a pilot-valve member unitary with the armature, and a pilot-valve seating formed in the diaphragm and communicating with the by-pass passage.

2. A fluid flow controlling valve comprising a valve body having a substantially cylindrical cavity therein with an inlet opening and an outlet opening at opposite ends thereof, the wall defining the end of said cavity adjacent the outlet opening being substantially hemispherical, the said wall defining said cavity having an axially-extending passage therethrough extending from a point substantially midway of the length of said cavity to a point downstream of and contiguous to said outlet opening; a coaxial cylindrical core within said cavity with its outer wall spaced inwardly from the wall defining said cavity to provide a flow passage therebetween, said core including a fluid pressure cylinder adjacent the outlet opening of the valve cavity and having a cylinder head disposed transversely of and substantially midway of the length of said cavity and core, said head having a passage therethrough with the outer end of said passage communicating with said axially-extending passage through said valve body, said cylinder communicating with the inlet opening of the valve cavity through an orifice located on the axis of said core, and a piston within said cylinder having a substantially hemispherical outer end portion directed toward the outlet opening of the valve cavity, said substantially hemispherical outer end portion of said piston constituting a valve for seating on said outlet opening; a bypass from said cylinder including said passage through said cylinder head and said axially-extending passage through said valve body; and a controllable throttling valve in said bypass for controlling the flow of fluid therethrough, said orifice being of lesser area than the bore defining said bypass.

3. A fluid flow controlling valve as defined in claim 2 in which the cylindrical core is supported within the cavity by circumferentially spaced webs extending between the outer surface of said core and the wall defining said cavity.

4. A fluid flow controlling valve as defined in claim 2 in which a compression spring is positioned between the head of the cylinder at the end of said core and the head of the piston within said cylinder.

5. A fluid flow controlling valve as defined in claim 3 in which the wall defining the end of said cavity adjacent the inlet opening is substantially hemispherical and the end of the core adjacent the inlet opening is substantially hemispherical.

References Cited in the file of this patent

UNITED STATES PATENTS

| Number | Name | Date |
|---|---|---|
| 1,141,114 | Henderson | June 1, 1915 |
| 1,961,599 | Schwitzer | June 5, 1934 |

FOREIGN PATENTS

| Number | Country | Date |
|---|---|---|
| 116,067 | Germany | Dec. 14, 1900 |
| 901,783 | France | Aug. 6, 1943 |